(12) United States Patent
Rogalla et al.

(10) Patent No.: US 8,522,423 B2
(45) Date of Patent: Sep. 3, 2013

(54) METHOD AND DEVICE FOR FEEDING AND ATTACHING CORRECTIVE ELEMENTS FOR UNBALANCE CORRECTION, IN PARTICULAR IN A BALANCING MACHINE

(75) Inventors: Martin Rogalla, Darmstadt (DE); Kuno Ebert, Gustavsburg (DE); Christian Muth, Fishbachtal (DE)

(73) Assignee: Schenck Ro Tec GmbH, Darmstadt (DE)

( * ) Notice: Subject to any disclaimer, the term of this patent is extended or adjusted under 35 U.S.C. 154(b) by 359 days.

(21) Appl. No.: 12/931,841

(22) Filed: Feb. 11, 2011

(65) Prior Publication Data
US 2011/0226055 A1    Sep. 22, 2011

(30) Foreign Application Priority Data
Mar. 19, 2010    (DE) .......................... 10 2010 003 085

(51) Int. Cl.
*B23P 21/00* (2006.01)
*G01M 1/16* (2006.01)

(52) U.S. Cl.
USPC .............................................. 29/714; 73/468

(58) Field of Classification Search
USPC .................... 29/714, 402.01, 402.04, 402.05, 29/402.07, 402.09, 402.16, 402.18, 402.19; 73/468
See application file for complete search history.

(56) References Cited

U.S. PATENT DOCUMENTS

| | | | |
|---|---|---|---|
| 4,861,214 A | 8/1989 | Sander | |
| 6,694,812 B2 | 2/2004 | Loetzner et al. | |
| 7,066,025 B1 | 6/2006 | Corbin | |
| 7,249,508 B2 | 7/2007 | Rogalla et al. | |
| 7,314,313 B2 * | 1/2008 | Rogalla et al. | 384/117 |
| 7,441,456 B1 | 10/2008 | Corbin et al. | |
| 2003/0024309 A1 | 2/2003 | Loetzner et al. | |
| 2005/0252349 A1 | 11/2005 | Rogallia et al. | |
| 2008/0223172 A1 | 9/2008 | Pullen et al. | |

FOREIGN PATENT DOCUMENTS

| | | |
|---|---|---|
| DE | 36 26 911 | 2/1988 |
| GB | 2 272 041 | 5/1994 |
| WO | WO 2004/005878 | 1/2004 |
| WO | WO 2006/027012 | 3/2006 |

OTHER PUBLICATIONS

British Search Report dated Jul. 1, 2011 in British Patent Application No. GB1104293.4.

* cited by examiner

*Primary Examiner* — John C Hong
(74) *Attorney, Agent, or Firm* — Collard & Roe, P.C.

(57) ABSTRACT

A device for feeding and attaching corrective elements for unbalance correction on propeller shafts in a balancing machine includes an attachment device positionable longitudinally to the rotor axis, with a receptacle for receiving a corrective element attachable to the outer rotor circumference. Associated with the balancing machine is a supply unit supplying corrective elements measured for the individual unbalance correction. A feeding device feeds supplied corrective elements to the attachment device and includes a transfer shuttle for performing reciprocating movements between the supply unit and the attachment device on a guideway parallel to the rotor axis via a controllable motion drive mechanism. The transfer shuttle includes a loading device for performing an active loading operation by displacing a corrective element from a receptacle of the transfer shuttle into the receptacle of the attachment device, the loading device being driven via the controllable motion drive mechanism of the transfer shuttle.

12 Claims, 4 Drawing Sheets

METHOD AND DEVICE FOR FEEDING AND ATTACHING CORRECTIVE ELEMENTS FOR UNBALANCE CORRECTION, IN PARTICULAR IN A BALANCING MACHINE

CROSS REFERENCE TO RELATED APPLICATIONS

Applicants claim priority under 35 U.S.C. §119 of German Patent Application No. 10 2010 003 085.6 filed Mar. 19, 2010.

FIELD OF THE INVENTION

This invention relates to a device for feeding and attaching corrective elements for unbalance correction to rotors having a rotor axis, in particular to propeller shafts, preferably in a balancing machine, with at least one attachment device adapted to be positioned longitudinally to the rotor axis and suitable for attaching a corrective element to the outer circumference of the rotor, with a stationary supply unit supplying corrective elements measured for the individual unbalance correction, and with a feeding device adapted to feed supplied corrective elements to the attachment device, said feeding device including a transfer shuttle having a receptacle for receiving a corrective element and being capable of performing reciprocating movements between the supply unit and the attachment device by means of a controllable motion drive mechanism. The present invention relates furthermore to a method of attaching corrective weights to rotors, in particular to propeller shafts, by means of such a device.

DESCRIPTION OF PRIOR ART

Methods and devices for unbalance correction find employment in volume production in order to balance rotors, for instance, propeller shafts, economically. For this purpose, existing unbalanced conditions of the rotors are detected by means of balancing machines and then corrected by removing or applying balance weights. On some workpieces, for example, on shafts or propeller shafts, it is suitable or even necessary to perform the unbalance correction by the attachment of balance weights, using welding devices for attaching the balance weights and applying a welding process in which a corrective element forming the balance weight is welded to the workpiece. To perform such an unbalance correaction speedily and automatically, it is necessary to feed suitable corrective elements to the welding device.

A balancing machine with a device of the type initially referred to is known from U.S. Pat. No. 7,441,456 B1. This known balancing machine serves to balance propeller shafts and includes a welding device which is adapted to be positioned in the axial direction of the propeller shaft in order to affix by welding metal elements to the propeller shaft to correct the determined out-of-balance condition. To accomplish this, the metal elements are severed from a metal ribbon in a forming station where they are cut to a length computed by a computer on the basis of measurement results and then shaped to an appropriate form by forming dies. The metal element thus formed is then held available by a gripper at the discharge end of the forming station. A shuttle movable on guide rails longitudinally along the balancing machine and having a vertically movable receptacle is advanced to a position beneath the gripper and picks up the metal element using an upward movement of the receptacle. The shuttle loaded with the metal element is then moved to the other end of the guide rails close to the balancing spindle. There the welding device picks up the metal element, in which process the welding electrode of the welding device is positioned to a location above the shuttle and is lowered down onto the metal element, and a pneumatic source then applies suction to disengage and hold the metal element in the electrode by vacuum while the welding device is moved to its welding position on the propeller shaft.

The known device is complicated and expensive to manufacture because of the need to provide pneumatic devices on the shuttle and the welding device which have to be controllably activated for transferring and holding the metal element. Another disadvantage is that the shuttle cannot be moved into the working area of the welding device so that it is necessary for the welding device to leave its working area to pick up the metal element for welding.

From U.S. Pat. No. 6,694,812 B2 a balancing machine for propeller shafts is known in which metal elements likewise severed from a ribbon for unbalance correction are welded to the propeller shaft by means of a welding device. In this disclosure, the device for cutting the metal element to length and forming it is arranged on a carriage which is movable longitudinally along the propeller shaft and also supports the welding device. As a result, the carriage is relatively heavy and requires complex feeding devices so that the traversing speed has to be kept at a low level.

WO 2004/005878 A1 discloses a device for attaching corrective weights to propeller shafts or Cardan shafts in a balancing machine which includes a pliers-type device adapted to be positioned longitudinally to the rotor axis and constructed to receive several corrective weights. The pliers-type device is operable to place the corrective weights on the outer circumference of the rotor to be secured there by welding.

SUMMARY OF THE INVENTION

It is an object of the present invention to provide a device of the type initially referred to and a method which enable the corrective elements to be fed from the supply unit to the attachment device with particular ease, speed and reliability.

According to the present invention, the device for feeding and attaching corrective elements for unbalance correction to rotors having a rotor axis, in particular to propeller shafts, preferably in a balancing machine comprises at least one attachment device adapted to be positioned longitudinally to the rotor axis and suitable for attaching a corrective element to the outer circumference of the rotor, and a feeding device adapted to feed corrective elements to be measured for the individual unbalance correction from a supply unit to the attachment device, said feeding device including a transfer shuttle having a receptacle for a corrective element and being capable of performing reciprocating movements between the supply unit and the attachment device on a guideway parallel to the rotor axis by means of a controllable motion drive mechanism, wherein the transfer shuttle includes a loading device configured for performing an active loading operation by extracting the corrective element from its receptacle and inserting it into the receptacle of the attachment device, and the loading device is driven to perform an active loading operation by means of the controllable motion drive mechanism of the transfer shuttle.

The device of the present invention distinguishes itself by a simple and economical configuration of the feeding device. The transfer shuttle has no further driving devices apart from the motion drive mechanism nor does it need any further energy supply. Also the receptacle for accommodating the corrective element on the attachment device is a simple construction requiring no additional devices for loading the corrective element because the loading operation is performed by means of the transfer shuttle. The transfer shuttle may be of comparatively small and light-weight construction enabling it to perform rapid movements with low energy demands.

According to another proposal of the invention, the guideway extends along the entire range of movement of the attachment device. Therefore, the corrective element to be attached can be moved by the transfer shuttle to any operating position of the attachment device. The movements of the attachment device may therefore be restricted to selecting the respective attachment location, thereby avoiding unnecessary movements of the attachment device which is substantially heavier and connected to power and control cables.

According to still another proposal of the invention, the receptacles arranged on the transfer shuttle and on the attachment device for accommodating a corrective element are so configured and arranged that the corrective element is displaceable by the loading device in a direction parallel to the guideway from the receptacle of the transfer shuttle into the receptacle of the attachment device. In this fashion, the approaching movement of the transfer shuttle to the attachment device and the loading operation of the corrective elements can be performed in a single pass using a continuous motion process. Loading therefore requires very little time, and the risk of malfunction is extremely low in view of the simple displacement process.

In a preferred embodiment, the receptacle arranged on the transfer shuttle and/or on the attachment device for receiving a corrective element includes guide bars substantially parallel to the guideway, between which bars the corrective element is adapted to be clamped in place by frictional engagement. This ensures secure holding of the corrective element on the transfer shuttle and on the attachment device, in addition to providing a guiding and secure holding function for the corrective element during the loading operation. An unsafe intermediate state in which the corrective element is temporarily released is thereby avoided.

In a simple and advantageous embodiment of the device of the invention, the receptacle for accommodating a corrective element is arranged on an auxiliary slide which is mounted on the transfer shuttle for movement in a positive-engagement straight-line guide parallel to the guideway and is urged against a stop of the transfer shuttle by the force of a spring, the stop acting to limit a movement of the auxiliary slide relative to the transfer shuttle, which movement is directed toward the attachment device, and said transfer shuttle mounting a loading pushrod which extends parallel to the straight-line guide in the direction of the receptacle and is movable into the interior of the receptacle when the auxiliary slide is moved away from the stop of the transfer shuttle against the force of the spring. This construction enables in a simple manner a loading operation to be performed by means of the motion drive mechanism of the transfer shuttle, with the auxiliary slide being held fast against the attachment device during the loading operation.

A particularly simple and low-cost configuration of the transfer shuttle may furthermore be accomplished by securing the loading pushrod to an upright arranged on the transfer shuttle at a distance from the auxiliary slide and by using as spring a compression spring which takes support on the upright.

To enable precise and interference-free insertion of the corrective elements into the attachment device, care must be taken to ensure that the attachment device and the transfer shuttle are accurately aligned to each other. To accomplish this, it is possible according to another proposal of the invention to arrange on the auxiliary slide on the one side and on the attachment device on the other side part of a positioning device which effects an alignment of the attachment device relative to the auxiliary slide necessary for the active loading operation. The positioning device may additionally include a sensor for monitoring the positioning necessary for the loading operation. The sensor signal may be evaluated by a control device for controlling the loading operation before the loading operation is activated.

To simplify the loading of the receptacle of the transfer shuttle in the supply unit, it is possible according to another proposal of the invention to arrange the receptacle of the transfer shuttle on a mounting body which is connected with the auxiliary slide in a displaceable or releasable manner and is displaceable relative to the auxiliary slide by the supply unit in such a way that a corrective element is insertable into the receptacle on the side of the mounting body facing away from the attachment device without any interference by the loading pushrod. This configuration allows an advantageous construction of the supply unit and easy loading of the transfer shuttle. An alternative embodiment may provide that the loading pushrod is movable by the supply unit into a position releasing access to the receptacle.

A preferred embodiment of the invention provides that the mounting body is carried on the auxiliary slide by means of a positive-engagement cross guide and is displaceable relative to the auxiliary slide in a direction transverse to the slide's direction of movement, and that the mounting body is locked against displacement relative to the auxiliary slide by a locking device arranged on the auxiliary slide. Moreover, the locking device may be unlockable by the supply unit when the transfer shuttle reaches the loading position on the supply unit. In the loading position of the transfer shuttle on the supply unit it is also possible for the mounting body to be removable from the auxiliary slide by the supply unit and movable into a loading compartment in which a corrective element is insertable into the receptacle of the mounting body.

The object initially referred to is furthermore solved by a method for feeding and attaching corrective elements for unbalance correction to rotors, in particular to propeller shafts, said method comprising the following steps:

arranging at least one attachment device adapted to be positioned longitudinally to the rotor axis, with a receptacle for accommodating a corrective element attachable to the outer circumference of the rotor;

arranging a stationary supply unit holding available corrective elements measured for the respective unbalance correction;

arranging a feeding device with a transfer shuttle which includes a receptacle for a corrective element, and with a guideway parallel to the rotor axis on which the transfer shuttle is capable of performing reciprocating movements between the supply unit and the attachment device by means of a controllable motion drive mechanism, and forming a loading device arranged on the transfer shuttle and actuatable by the motion drive mechanism;

loading the transfer shuttle arranged on the supply unit in a loading position by inserting a corrective element into the receptacle of the transfer shuttle;

moving the attachment device into an attachment position on the rotor;

moving the transfer shuttle by means of the motion drive mechanism until its abutment with the attachment device;

performing a loading operation by driving the loading device by means of the motion drive mechanism of the transfer shuttle and extracting the corrective element from the receptacle of the transfer shuttle and inserting it into the receptacle of the attachment device; and returning the transfer shuttle to the supply unit.

BRIEF DESCRIPTION OF THE DRAWINGS

The present invention will be explained in more detail in the following with reference to embodiments illustrated in the accompanying drawings. In the drawings.

DETAILED DESCRIPTION OF THE EMBODIMENTS

Figure 1:
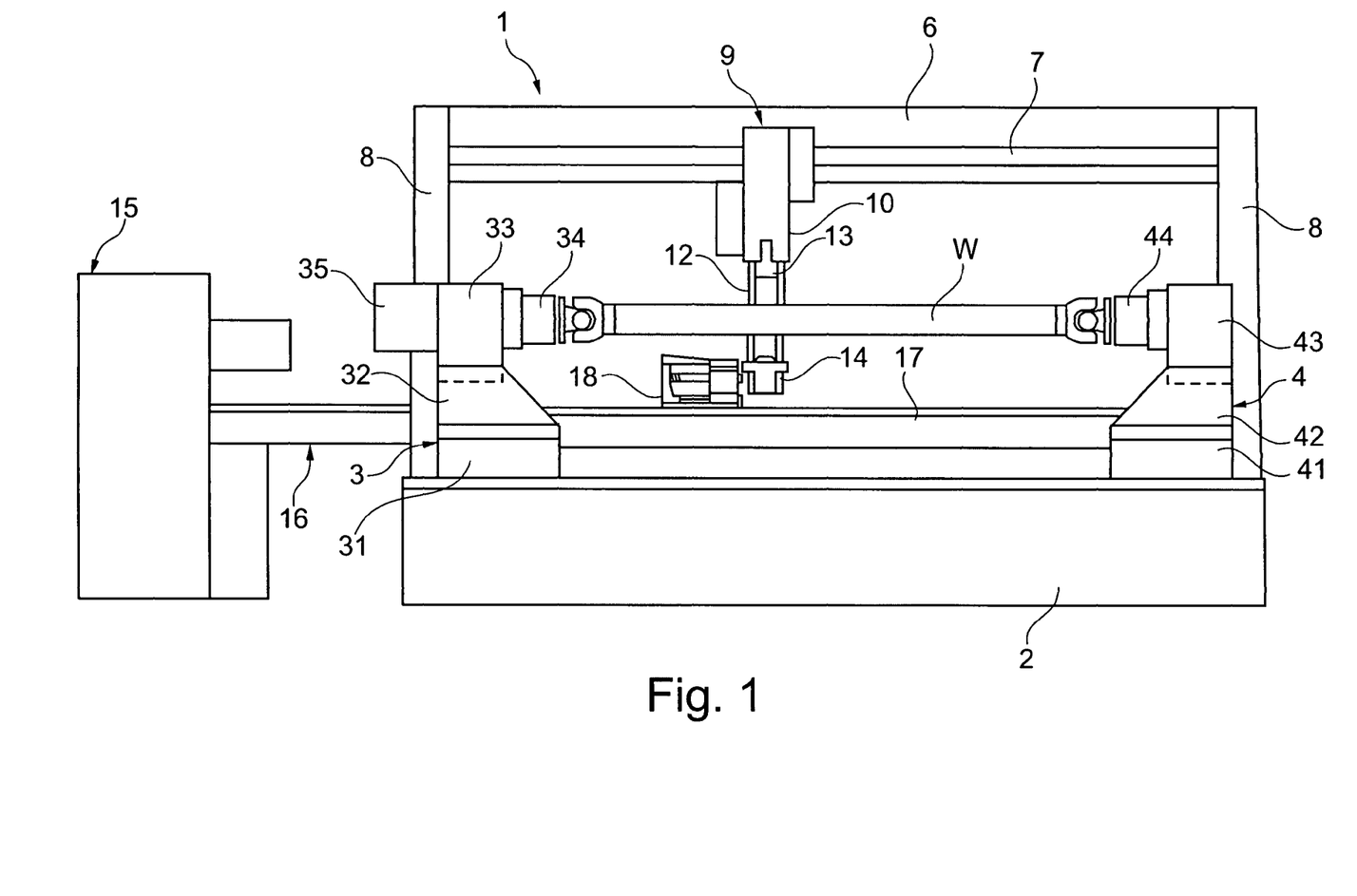
FIG. 1 is a view of a balancing machine for balancing propeller shafts.

FIG. 1 shows a balancing machine 1 for balancing propeller shafts. The balancing machine includes a machine bed 2 on which two pedestals 3, 4 are arranged at opposite ends. Each of the pedestals 3, 4 has a base 31, 41 which is carried in a straight-line guide extending in the longitudinal direction of the machine bed 2 and is movable relative to the machine bed 2 by means of a traversing drive in order to enable the relative distance of the pedestals 3, 4 to be adjusted to the length of the propeller shaft to be balanced. Extending upwardly from the bases 31, 41 are, respectively, leaf springs 32, 42 arranged in pairs. Secured to the upper ends of each pair of leaf springs 32, 42 is a respective spindle housing 33, 43 each receiving a spindle mounted therein for rotation. The spindles of the spindle housings 33, 43 are coaxially arranged and have at their ends facing each other a respective clamping fixture 34, 44 for clamping a fastening end, for example, the end flange of a propeller shaft W, with precise locating accuracy. The spindle housing 33 mounts a drive motor 35 enabling the spindle and the clamping fixture 34 connected to it to be driven rotatably. The spindle in the spindle housing 43 is freely rotatable, though it may be equally equipped with a drive. Also arranged on the spindle housings 33, 43 are vibration sensors, not shown, which sense the vibrations generated by an unbalanced condition during a measuring run, transmitting them in the form of electrical signals to an electronic computing unit which computes therefrom location and amount of the unbalance to be corrected.

Further arranged on the machine bed 2 is a support beam 6 which extends parallel to the machine bed 2 and includes a support rail 7 parallel to the axis of the spindles. The ends of the support beam 6 are secured to uprights 8 or holders which are fixedly connected with the machine bed 2. An attachment device 9 in the form of a welding device 10 is slidably mounted on the support rail 7. A drive mechanism 11 is operable to move the welding device 10 along the support rail 7 and to locate it in any desired position. The welding device 10 has a pair of welding tongs 12 with two arms 13, 14 which are movable into a position embracing the propeller shaft W and can be pressed against the propeller shaft W for welding a corrective element serving as balance weight in the form of a bent piece of sheet metal. The welding device 10 operates according to the resistance welding technique, with the arms 13, 14 of the welding tongs 12 forming electrodes connected to a power source during the welding operation.

To present the corrective elements for unbalance correction, the balancing machine 1 has associated with it a supply unit 15 which is fixedly arranged at one end of and adjacent to the balancing machine 1. The supply unit 15 is connected to the electronic control unit of the balancing machine 1 and configured to produce corrective elements of various sizes. To this effect, sections of different lengths predetermined by the control of the balancing machine 1 are severed from a metal ribbon and bent to a shape suitable for attachment to the propeller shaft W.

To transfer the corrective elements held available by the supply unit 15 to the welding device 10, a feeding device 16 is provided which includes a guideway 17 extending longitudinally to the balancing machine 1 and up to the supply unit 15, and a transfer shuttle 18 movable along the guideway 17. The guideway 17 is aligned parallel to the support rail 7 and secured to the machine bed 2 and the supply unit 15. It includes guide rails supporting the transfer shuttle 18, and a motion drive mechanism which is controlled by the control of the balancing machine 1 and enables a controlled linear movement of the transfer shuttle 18 along the entire guideway 17. The motion drive mechanism may include an endless toothed belt which extends longitudinally to the guideway and is routed around idler pulleys at the ends of the guideway, with one of the idler pulleys being adapted to be driven by a position-controllable electric motor. Alternatively, the motion drive mechanism may be constructed as a linear electric motor.

Figure 2:
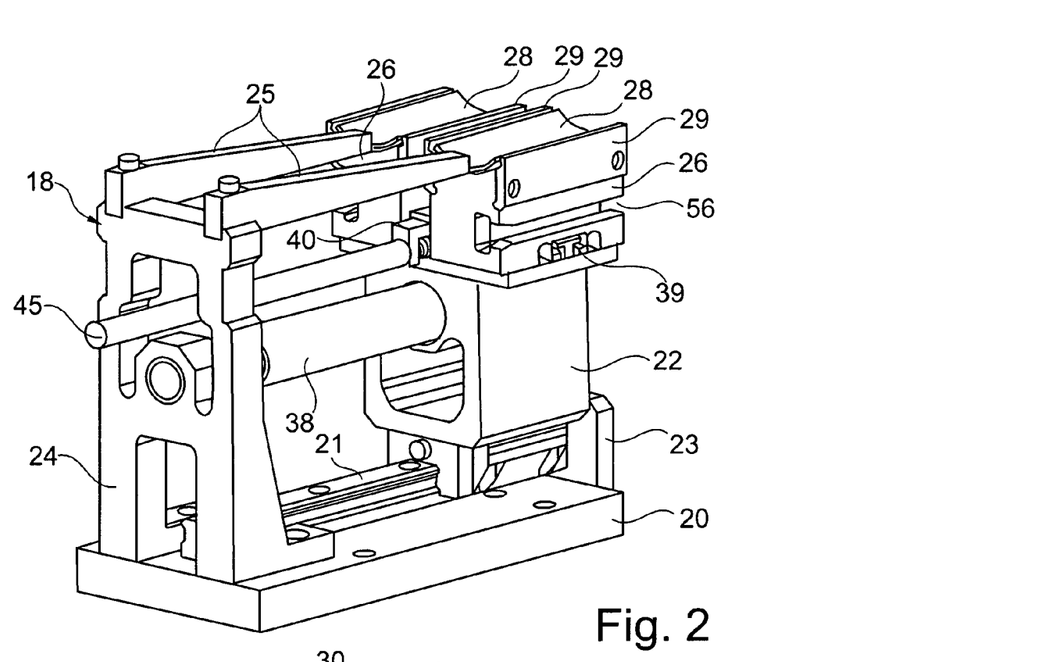
FIGS. 2 to 4 are various views of a transfer shuttle.
Figure 3:
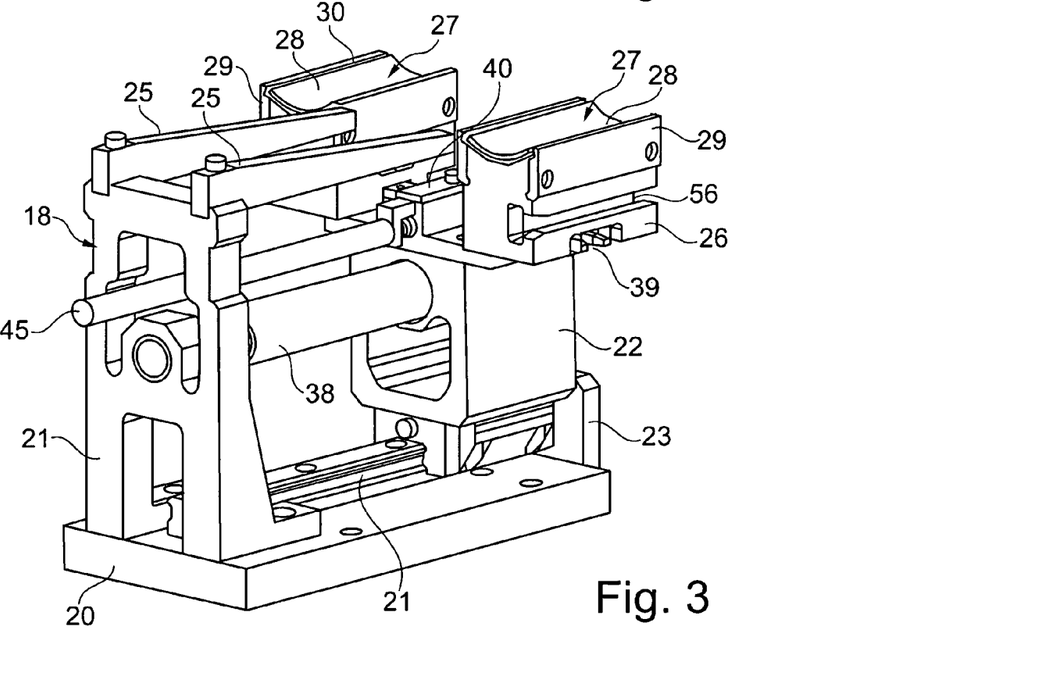
Figure 4:
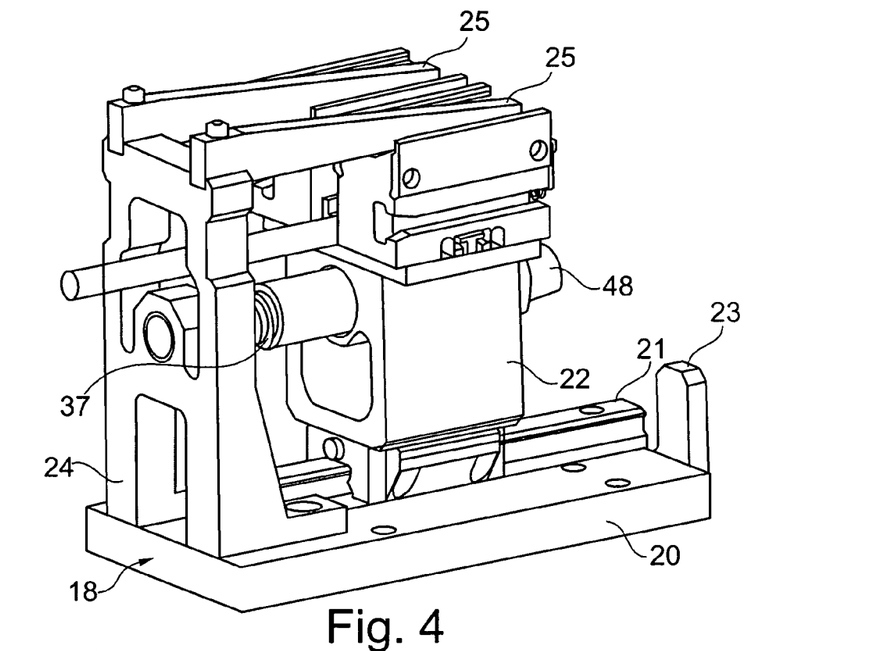

The transfer shuttle 18 is shown in FIGS. 2 to 4 in various positions. The transfer shuttle 18 has a rectangular base plate 20 having secured to its underside a slide body mounted on the guideway 17. Fitted to the upper side of the base plate 20 is a guide rail 21 parallel to the guideway 17, which forms a positive-engagement straight-line guide for an auxiliary slide 22. The base plate 20 has at one end thereof a fixed stop 23 to limit the movement of the auxiliary slide 22 to the end of the base plate 20. Secured to the opposite end of the base plate 20 is an upright 24 carrying at its upper end two loading pushrods 25 spaced in a parallel relationship to each other. The lower boundary surfaces of the loading pushrods 25 facing the base plate 20 lie in a plane parallel to the base plate 20. The auxiliary slide 22 has on its upper side facing away from the base plate 20 two mounting bodies 26 in parallel arrangement. Each mounting body defines with its upper side a receptacle 27 for a corrective element 28. The receptacles 27 are shaped in the manner of a shallow groove which extends in the direction of movement of the auxiliary slide 22 and is defined by a middle boundary surface parallel to the base plate 20 and two lateral boundary surfaces inclined toward the middle boundary surface. The middle boundary surfaces of the receptacles 27 are spaced from the base plate 20 by a distance slightly smaller than the distance between the loading pushrods 25 and the base plate 20. In the conveying state of the transfer shuttle 18 shown in FIG. 2, the middle boundary surfaces of the receptacles 27 are in a region extending the loading pushrods 25 in a straight line, so that a displacement of the auxiliary slide 22 in the direction of the upright 24 causes the loading pushrods 25 to be displaced over the middle boundary surfaces of the receptacles 27, thereby pushing the corrective elements 28 arranged in the receptacles 27 out of the receptacles.

Arranged on both longitudinal sides of the receptacles 27 are guide bars 29 having on their sides facing the receptacles 27 guide grooves 30 for engagement by the longitudinal edges of the corrective elements 28. Moreover, the guide bars 29 are biased by means of springs, not shown, in the direction of the receptacles 27 whereby they are clamped against the corrective elements 28 to retain these in the receptacles 27 by frictional engagement.

Seated between the auxiliary slide 22 and the upright 24 is a compression spring 37 surrounded in part by a sleeve 38. The compression spring 37 is biased and serves the function of urging the auxiliary slide 22 against the stop 23.

FIG. 4 shows the transfer shuttle 18 with an auxiliary slide 22 moved up against the upright 24 in opposition to the force of the compression spring 37. In this position of the auxiliary slide 22 which corresponds to the end of a loading operation for loading the attachment device 9, the loading pushrods 25 extend up to, or even beyond, the end of the receptacles 27 adjacent to the stop 23. The corrective elements 28 previously held in the receptacles 27 were therefore completely pushed out of the receptacles 27.

The mounting bodies 26 are supported on the auxiliary slide 22 by means of a positive-engagement cross guide 39 for displacement in a direction parallel to the base plate 20 and vertical to the direction of movement of the auxiliary slide 22. As a result of this support, the mounting bodies 26 are displaceable relative to the auxiliary slide 22 from their initial position toward the side as shown in FIG. 3, and removable from the auxiliary slide 22 as will be explained in the following, in order to enable new corrective elements 28 to be loaded in the supply unit 15. Arranged in the middle between the mounting bodies 26 is a spring-loaded locking device 40 causing the mounting bodies 26 to be locked against lateral displacement when they are in the initial position moved toward the middle on the auxiliary slide 22. The locking device 40 includes an actuating rod 45 which projects beyond the upright 24, acting in cooperation with the supply unit 15 and unlocking the locking device 40 when the transfer shuttle 18 is moved into the loading position on the supply unit 15.

Figure 5:
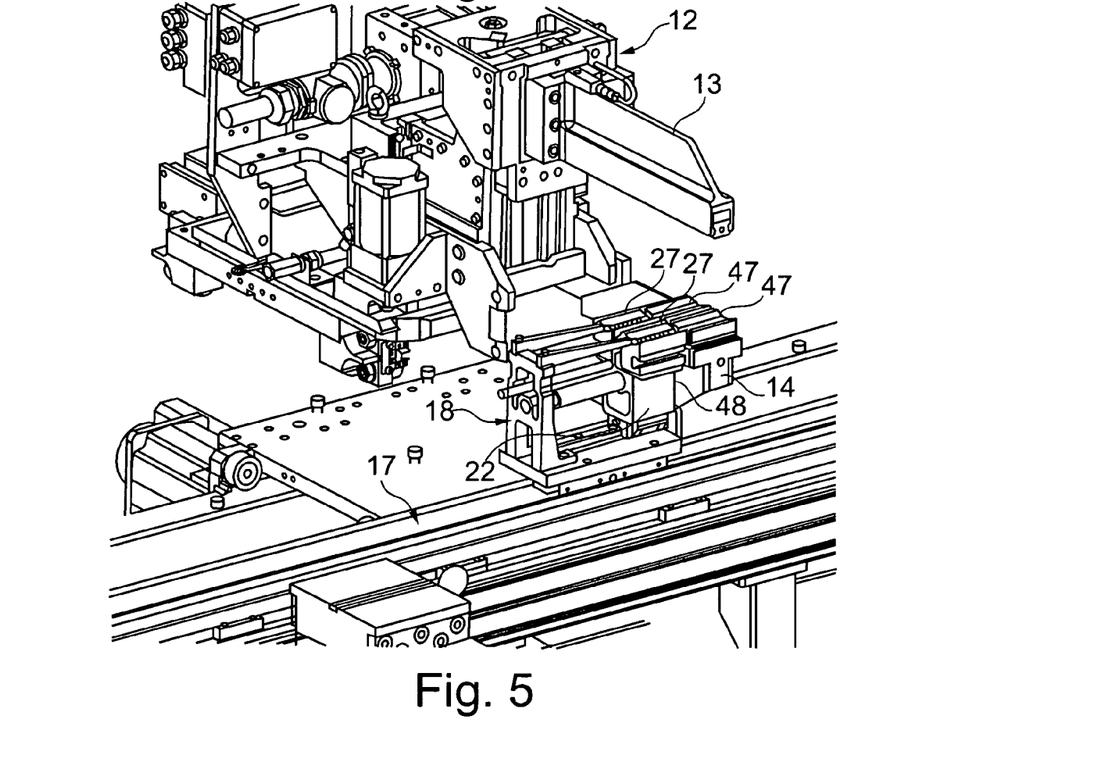
FIG. 5 is a fragmentary view of the balancing machine of FIG. 1.

As becomes apparent from FIG. 5, the welding tongs 12 of the welding device 10 has on its lower arm 14 two adjacent receptacles 47 for accommodating corrective elements. The receptacles 47 are constructed in the same manner as the receptacles 27 on the transfer shuttle 18 and are spaced by the same distance as these. The welding tongs 12 is movable in conventional manner by means of drives horizontally and vertically in the longitudinal direction of the rotor axis and transversely to the rotor axis. In addition, the distance between the arms 13, 14 is variable. For loading corrective elements, these drives operate to position the arm 14 of the welding tongs 12 in such a way that the receptacles 47 are in alignment with the receptacles 27 of the transfer shuttle 18 moved up against the arm 14 on its guideway 17. For a precise alignment a mechanical positioning device 48 is furthermore provided, which is comprised of a conical cam arranged on the stop side of the auxiliary slide 22 and a cooperating centering opening on the arm 14.

The loading operation is started as soon as the transfer shuttle 18 with its auxiliary slide 22 abuts the arm 14 and is aligned by the positioning device 48. In this process, the motion drive mechanism operates to move the transfer shuttle 18 further in the direction of the arm 14. Because the arm 14 prevents the auxiliary slide 22 from following this movement, it is displaced on the transfer shuttle 18 in the direction of the upright 24. As this occurs, the loading pushrods 25 enter the receptacles 27 on the auxiliary slide 22, thereby urging the corrective elements 28 held in the receptacles 27 into the receptacles 47 of the arm 14. The loading operation is terminated when the auxiliary slide 22 occupies the position shown, for example, in FIG. 4 and the loading pushrods 25 have pushed the corrective elements 28 completely into the receptacles 47. The end position of the loading pushrods 25 relative to the receptacles 47 of the arm 14 is determined by the controllable position of the transfer shuttle 18 and the equally controllable position of the welding tongs 12. Accordingly, it may be controlled by means of the drive mechanism of the transfer shuttle 18 in such a way that the loaded corrective element 28 occupies a defined position in the direction of the rotor axis, for example, a center position, in the receptacle 47 of the arm 14.

Following termination of the loading operation, the transfer shuttle 18 is returned to the supply unit to be loaded there with new corrective elements. In this process, the compression spring 37 urges the auxiliary slide 22 on the transfer shuttle 18 back into the initial position in which the auxiliary slide 22 is in abutment with the stop 23.

Figure 6:
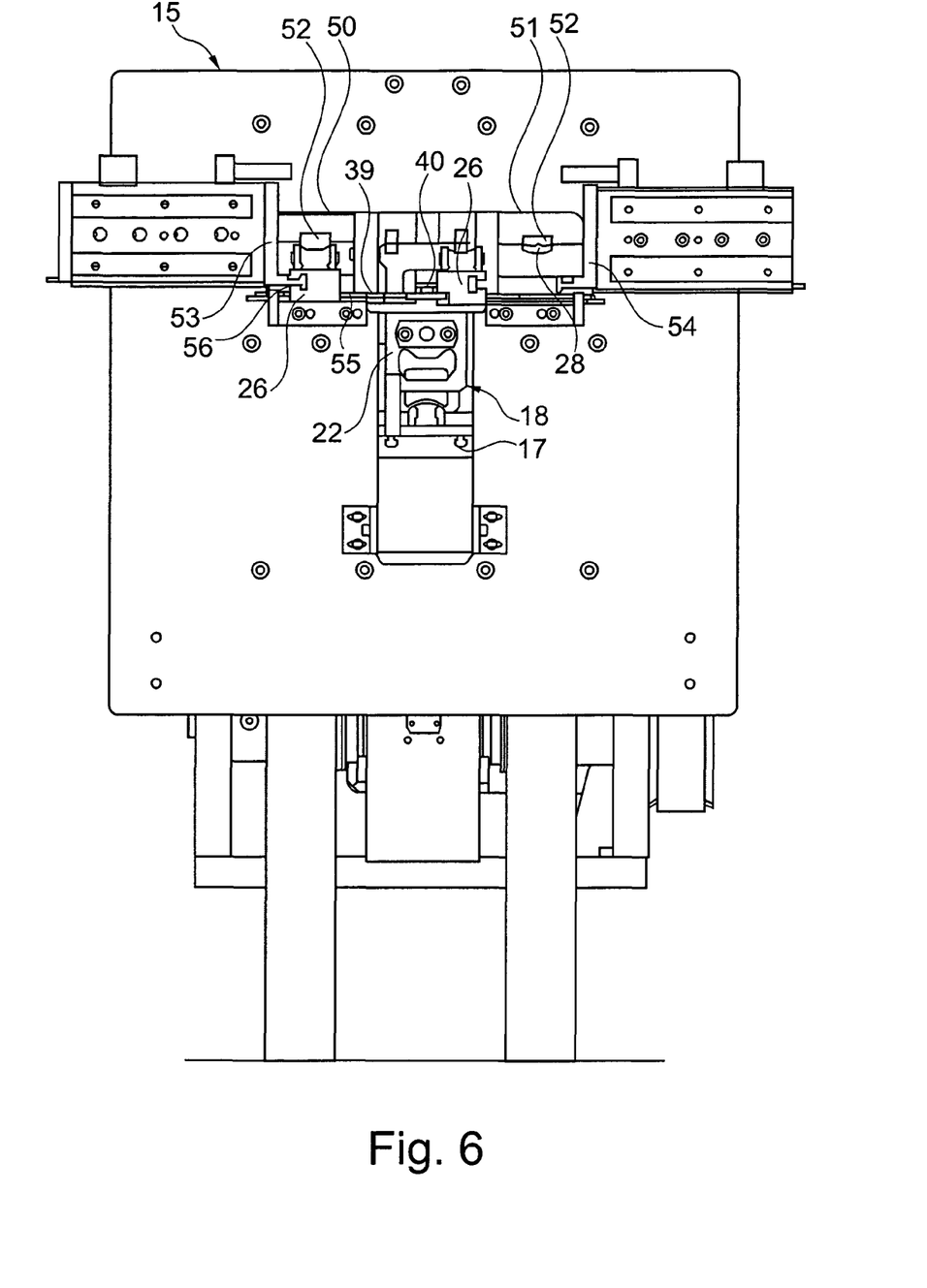
FIG. 6 is a view of the supply unit of the balancing machine of FIG. 1.

FIG. 6 is a view of the supply unit 15 orthogonal to the direction of movement of the transfer shuttle 18. The transfer shuttle 18 has been moved along the guideway 17 into the end position on the supply unit 15. In this process, the locking device 40 has been moved into the unlocking position. The supply unit 15 includes symmetrically on both sides of the transfer shuttle 18 loading compartments 50, 51 in which loading devices 52 for the insertion of corrective elements into the receptacles 27 of the transfer shuttle 18 are arranged. For a loading operation, a gripper 53, 54 arranged laterally adjacent to the loading compartment 50, 51 and movable by a lifting cylinder in a direction transverse to the guideway 17 operates to pull the mounting body 26 along the cross guide 39 down from the auxiliary slide 22 and onto a guide rail 55 of the supply unit 15 aligned with the cross guide. To accomplish this, the gripper 53 engages a groove 56 (see also FIG. 2) on the outside of the mounting body 26 while the transfer shuttle 18 is moved up against the supply unit 15.

In FIG. 6, the gripper 53 has pulled the left-hand mounting body 26 into the loading compartment 50. According to the view shown in the drawing, in this position it is then possible for a corrective element cut to its proper length to be pushed from behind into the receptacle 27 of the mounting body 26, with the mounting body 26 being held by the guide rail 55 and the gripper 53. Upon loading, the gripper 53 returns the mounting body 26 along the guide rail 55 and the cross guide 39 to the initial position on the auxiliary slide 22.

In the operating situation shown in FIG. 6, the right-hand gripper 54 was not extended while the transfer shuttle 18 pulled in so that it was not in engagement with the groove 56 of the adjacent mounting body 26. In this case, the transfer shuttle should be loaded with only one corrective element. In the loading device 52 shown in the loading compartment 51, a corrective element 28 held available is to be seen.

When the transfer shuttle 18 leaves the supply unit 15 to perform a new loading operation, the locking device 40 is automatically returned to the locking position by the force of a spring 37, whereby the mounting bodies 26 are securely held on the auxiliary slide 22 in their initial position close to the center of the shuttle.

The device described and the method to be implemented with it effect a very speedy transport of the corrective elements from the supply unit to the attachment device in addition to ensuring simple and reliable transfer of the corrective elements. The device distinguishes itself by its straightforward construction. This makes it a low-cost and easy-to-maintain item. The transfer shuttle requires no power supply, and unnecessary movements of the attachment device are avoided. The configuration of the feeding device and the supply unit is largely independent of the configuration of the balancing machine and is therefore also suitable for retrofitting existing machines. The arrangement of two receptacles lying side-by-side for receiving corrective elements enables two different corrective elements to be fed at a time, for example, for attachment to different segments of the propeller shaft which differ in diameter.

It should be noted that the present invention is not limited to the embodiments described but may be implemented by numerous modifications within the scope of the claimed invention. For instance, in lieu of the mounting bodies of the auxiliary slide, the loading pushrods may be arranged for movement on the transfer shuttle in such a way as to be movable out of their position, for example, laterally, for loading the receptacles on the transfer shuttle, in order to enable access to the receptacles for the corrective elements. Furthermore, it is also possible to provide a rotary fastening of the loading bodies on the auxiliary slide instead of a cross guide. Equally, it is possible for the corrective elements to be fed from the side of the receptacles opposite the loading pushrods if the supply unit is correspondingly constructed.

What is claimed is:

1. A device for feeding and attaching corrective elements for unbalance correction to rotors having a rotor axis, comprising
    at least one attachment device adapted to be positioned longitudinally to the rotor axis and including a receptacle for receiving a corrective element attachable to the outer circumference of the rotor,
    a stationary supply unit supplying corrective elements measured for the individual unbalance correction, and
    a feeding device adapted to feed supplied corrective elements to the attachment device, said feeding device including
    a transfer shuttle having a receptacle for receiving a corrective element and being capable of performing reciprocating movements between the supply unit and the attachment device on a guideway parallel to the rotor axis by means of a controllable motion drive mechanism,
    the transfer shuttle including a loading device configured for performing an active loading operation by extracting the corrective element from the receptacle of the transfer shuttle and inserting it into the receptacle of the attachment device, wherein the loading device is driven to perform an active loading operation by means of the controllable motion drive mechanism of the transfer shuttle.

2. The device according to claim 1, wherein the guideway of the transfer shuttle extends along the entire range of movement of the attachment device.

3. The device according to claim 1, wherein the receptacles arranged on the transfer shuttle and on the attachment device for accommodating a corrective element are so configured and arranged that the corrective element is displaceable by the loading device in a direction parallel to the guideway from the receptacle of the transfer shuttle into the receptacle of the attachment device.

4. The device according to claim 3, wherein the receptacle arranged on the transfer shuttle and/or on the attachment device for receiving a corrective element includes guide bars substantially parallel to the guideway, between which guide bars the corrective element is adapted to be clamped in place by frictional engagement.

5. The device according to claim 1, wherein the receptacle of the transfer shuttle for accommodating a corrective element is arranged on an auxiliary slide which is mounted on the transfer shuttle for movement in a positive-engagement straight-line guide parallel to the guideway and is urged against a stop of the transfer shuttle by the force of a spring, said stop acting to limit a movement of the auxiliary slide relative to the transfer shuttle, which movement is directed toward the attachment device, and that said transfer shuttle mounts a loading pushrod which extends parallel to the straight-line guide in the direction of the receptacle and is movable into the interior of the receptacle when the auxiliary slide is moved away from the stop of the transfer shuttle against the force of the spring.

6. The device according to claim 5, wherein the loading pushrod is secured to an upright arranged on the transfer shuttle at a distance from the auxiliary slide, and that the spring a compression spring which takes support on the upright.

7. The device according to claim 5, wherein on the auxiliary slide on the one side and on the attachment device on the other side part of a positioning device is arranged which effects an alignment of the attachment device relative to the auxiliary slide for performing the desired active loading operation.

8. The device according to claim 5, wherein the receptacle for receiving a corrective element on the transfer shuttle is arranged on a mounting body which is connected with the auxiliary slide in a releasable manner, and that a locking device is arranged on the auxiliary slide by means of which the mounting body is locked against disengagement from the auxiliary slide.

9. The device according to claim 8, wherein in a loading position of the transfer shuttle the mounting body is removable from the auxiliary slide by the supply unit and movable into a loading compartment in which a corrective element is insertable into the receptacle of the mounting body.

10. The device according to claim 8, wherein the mounting body is carried on the auxiliary slide by means of a positive-engagement cross guide and is displaceable relative to the auxiliary slide in a direction transverse to the slide's direction of movement, and that the mounting body is locked against displacement relative to the auxiliary slide by the locking device arranged on the auxiliary slide, and that the locking device is unlockable by the supply unit when the transfer shuttle reaches the loading position on the supply unit.

11. A method for feeding and attaching corrective elements for unbalance correction to rotors by using a device according to claim 1, comprising the steps of:
    arranging at least one attachment device adapted to be positioned longitudinally to the rotor axis, with a receptacle for accommodating a corrective element attachable to the outer circumference of the rotor;
    arranging a stationary supply unit holding available corrective elements measured for the respective unbalance correction;
    arranging a feeding device with a transfer shuttle which includes a receptacle for a corrective element, and with a guideway parallel to the rotor axis on which the transfer shuttle is capable of performing reciprocating movements between the supply unit and the attachment device by means of a controllable motion drive mechanism;
    creating a loading device on the transfer shuttle which is actuatable by the motion drive mechanism of the transfer shuttle;
    loading the transfer shuttle arranged on the supply unit in a loading position by inserting a corrective element into the receptacle of the transfer shuttle;
    moving the attachment device longitudinally to the rotor axis into the plane for attaching the corrective element to the rotor;
    moving the transfer shuttle by means of the motion drive mechanism until its abutment with the attachment device;
    performing a loading operation by driving the loading device by means of the motion drive mechanism of the transfer shuttle and extracting the corrective element from the receptacle of the transfer shuttle and inserting it into the receptacle of the attachment device; and
    returning the transfer shuttle to the supply unit.

12. The method according to claim 11, wherein for loading a corrective element the transfer shuttle is moved by the supply unit continuously in a single pass up to the end position on the attachment device terminating the loading operation.

\* \* \* \* \*